UNITED STATES PATENT OFFICE.

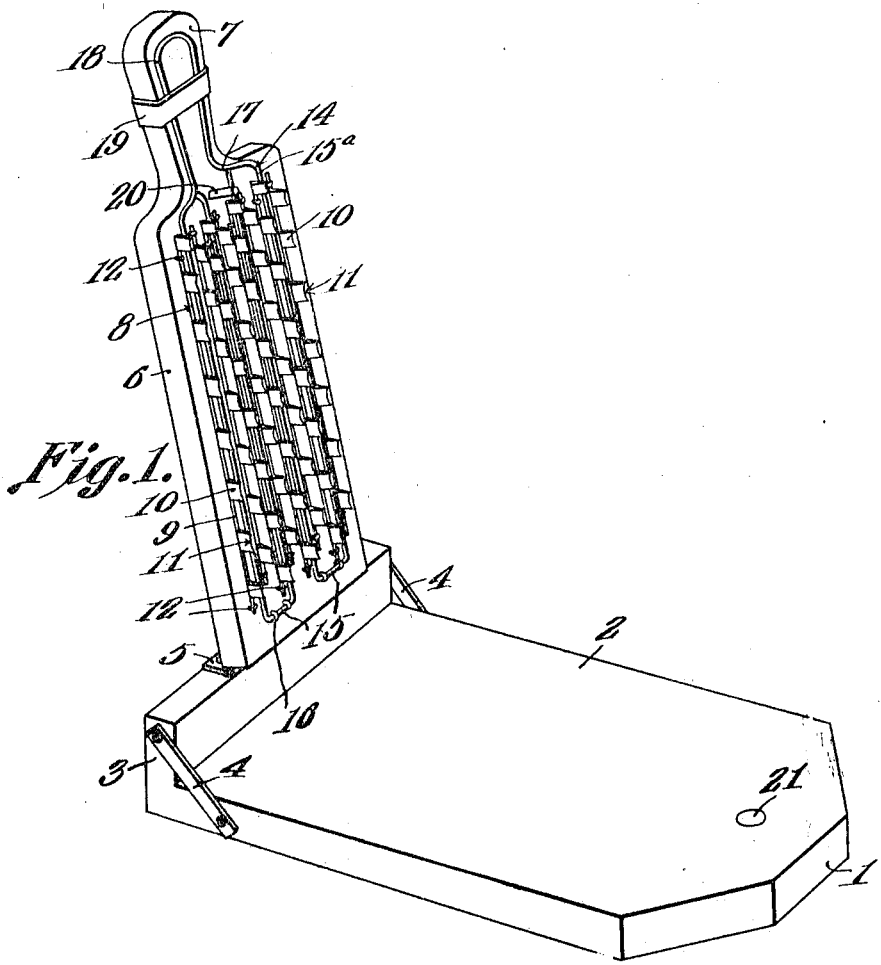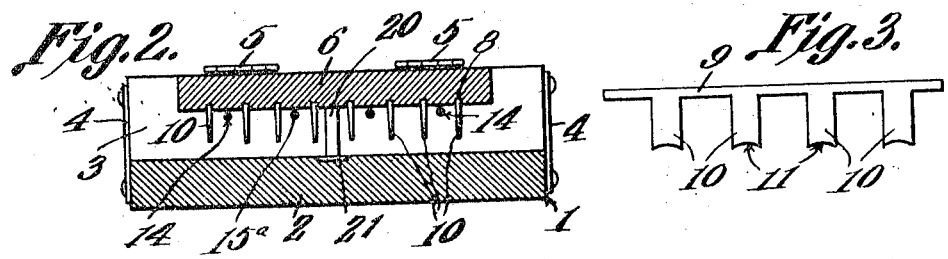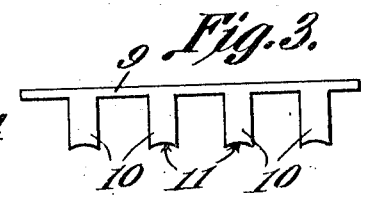

CHARLES E. BROWN, OF NORWAY, MAINE.

MEAT-TENDERER.

1,048,288.  Specification of Letters Patent.  Patented Dec. 24, 1912.

Application filed November 11, 1911. Serial No. 659,851.

*To all whom it may concern:*

Be it known that I, CHARLES E. BROWN, a citizen of the United States, residing at Norway, in the county of Oxford and State of Maine, have invented a new and useful Meat-Tenderer, of which the following is a specification.

The present invention aims to provide a device for rendering beefsteak tender, without unduly bruising the steak upon the one hand, and without reducing the steak to hash upon the other hand.

A further object of the invention is to provide a meat tenderer comprising fixed and movable members, the movable member being equipped with blades of novel and improved form.

The invention aims, moreover, to provide means whereby the blades of the movable member are prevented from extending entirely through the meat, to provide a separator of novel and improved form, whereby the meat may be removed from the blades, and to provide novel means for uniting the separator with the movable member.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in perspective; Fig. 2 is a transverse section, the fixed and movable members being in parallelism; and Fig. 3 is a side elevation of a series of blades which are carried by the movable member.

In carrying out the invention there is provided a fixed member, denoted generally by the numeral 1, the fixed member 1 including a base 2 and an end wall 3 outstanding from one end of the base 1. The end wall 3 may be secured to the base 1 by means of braces 4.

Hinges 5 unite the end wall 3 with the movable member 6, the free end of which is reduced to form a handle 7. Extended longitudinally of the movable member 6, in its under face, are a series of grooves 8, receiving bars 9 from which outstand blades 10, the cutting ends of which are concaved and preferably sharpened, as shown at 11. Staples 12 may be extended across the bars 9, to hold the same in place in the grooves 8. Noting Fig. 1 it will be observed that, transversely of the movable member 6, the blades 10 of one bar 9 alternate with the blades 10 of the next adjoining bar 9.

The invention further includes a separator, denoted generally by the numeral 14. The separator 14 consists of a pair of loops 15, pivotally connected with the movable member 6, adjacent the hinges 5, through the instrumentality of staples 16 which are straddled over the ends of the loops. The arms 15ª of the loops 15 lie between the longitudinally extending series of blades 10. As shown at 17, those ends of the loops 15 which are adjacent the handle 7 of the movable member 6, are connected with the handle portion 18 of the separator. Any suitable means may be provided for holding the separator against the movable member 6. In the present instance, a resilient band 19 is made to inclose the handle 7 of the movable member 6, and the handle portion 18 of the separator 14.

Adjacent its handle portion 7, the movable member 6 is provided with a depending pin 20, adapted to engage a plate 21 countersunk into the base 2 of the fixed member 1. Noting Fig. 2 it will be observed that when the pin 20 strikes the plate 21, the lower edges of the blades 10 are spaced apart from the upper surface of the base 2 of the fixed member.

The operation of the device hereinbefore described is as follows. The meat which is to be operated upon, is laid across the base 2, whereupon the movable member 6, together with the separator 14, are brought downwardly, until the blades 10 enter the upper surface of the meat. Owing to the fact that the lower edges of the blades 10 are spaced apart from the upper face of the base 2, through the coöperation of the pin 20 and the plate 21, the blades 10 never pass quite through the steak. Therefore, although the steak is cut by a plurality of slits and thoroughly tendered, the steak is never pierced through from side to side. After the steak has been struck by the blades 10, the separator 14 is held down, the movable member 6 being swung into the position shown in Fig. 1. The steak will thus be held upon the base 2. The steak may then be turned around at right angles to its former position, whereupon the operation above described may be repeated, the steak being reversed, to dispose its opposite side uppermost for treatment by the blades 10. Owing to the fact that the blades 10 of one line alternate longitudinally of the block with the blades 10 of the next adjoining line, the steak will be thoroughly treated and tendered, without being divided into bits.

After a steak has been treated in the device herein disclosed, the hot air and butter, in the process of cooking, will penetrate the various cuts in the steak, thereby causing it to cook quickly and evenly. A tough steak, when properly treated with the device constituting the subject-matter of this invention, becomes tender, and retains its original juices and flavor, such a steak being rendered, by the manipulation of the device herein disclosed, fully equal to a tenderloin steak, so called.

Having thus described the invention, what is claimed is:—

A meat tenderer comprising a fixed member; a movable member hingedly connected with the fixed member; blades upon the movable member; and a separator hingedly connected with the movable member and adapted to lie between the blades, the separator and the movable member being provided with registering handle portions, whereby the separator and the movable member may be held together for simultaneous movement, the separator being adapted to be held manually upon the meat, and the movable member being actuable independently of the separator, and while the separator is held pressed upon the meat.

In testimony that I claim the foregoing as my own, I have hereto affixed my signature in the presence of two witnesses.

CHARLES E. BROWN.

Witnesses:
WM. W. WHITMARSH,
FRANK E. DE COSTER.